June 11, 1963    W. B. SEIDEL    3,093,128
GRINDING MACHINE TRUING MECHANISM
Filed Oct. 20, 1960    5 Sheets-Sheet 1

INVENTOR.
WILLIAM B. SEIDEL
BY
ATTORNEYS

United States Patent Office 3,093,128
Patented June 11, 1963

3,093,128
GRINDING MACHINE TRUING MECHANISM
William B. Seidel, Terrace Park, Ohio, assignor to The Cincinnati Milling Machine Co., Cincinnati, Ohio, a corporation of Ohio
Filed Oct. 20, 1960, Ser. No. 63,804
7 Claims. (Cl. 125—11)

The present invention relates to a grinding machine truing mechanism and, more particularly, to mechanism to true a periphery on the grinding wheel shaped to form a gothic arch groove in a workpiece.

In the fabrication of many types of parts it is desired to grind a groove having a cross-section in the form of a gothic arch. Such a groove, for example, is commonly used on races of ball bearings so that the race will make two point contact with the bearing balls. One method for producing a gothic arched groove requires that a split part be utilized and a shim interposed between the halves thereof for grinding. After the part has been ground with a wheel having a periphery of semi-circular cross-section, the shim is removed and the halves joined. To expedite the production of gothic grooved parts, the use of a grinding wheel having a periphery of arcuate sides intersecting at a peak has been proposed, the contour on the wheel being trued by a cutting tool guided by a template. Although these devices permit grinding a gothic groove in a unitary workpiece, the use of a template introduces to the grinding wheel imperfections in the template, and accuracy is difficult to maintain as the template becomes worn by repeated use. Moreover, any change in the span of the gothic arch groove to be formed in the workpiece requires modifications in the template.

In the present invention there is provided mechanism to quickly and accurately true circular convex sides intersecting at a peak on the periphery of a grinding wheel without use of a template. In brief, in the preferred embodiment of the invention, a bracket is pivotally mounted on a support and carries a cutting tool pointing toward and spaced from the pivot axis so that the cutting point on the inner end of the cutting tool swings in a circular arc in the same manner as in devices used to form a periphery of semi-circular cross-section on the grinding wheel. However, the support and grinding wheel are initially positioned with the center of the circular arc defined by one side of the wheel periphery contour to be formed lying in the pivot axis so that when the truing tool is swung one side of the desired contour is generated on one side of the periphery of the rotating wheel. The support and the grinding wheel are relatively shiftable in a direction parallel to the axis of the grinding wheel by a hydraulic motor having a fixed, but adjustable, stroke connected to the grinding wheel spindle. This motor shifts the grinding wheel spindle axially a distance equal to the distance between the centers of the sides of the grinding wheel periphery so that the center of the circular arc defined by the other side of the wheel periphery contour to be formed can be shifted to the pivot axis for generation of the other side of the desired contour on the periphery of the rotating wheel. By merely adjusting the stroke of the motor, circular sides of the periphery spaced apart different amounts can be generated. As in conventional truing mechanisms, the support is also shiftable toward the grinding wheel to advance the cutting tool in increments as required for successive cuts on the wheel.

With this construction, a variety of truing cycles can be quickly and automatically executed without retracting the cutting tool. For example, if a cut with a dead pass (that is, a pass made over a previously cut surface without advancement of the tool) is desired to produce a glazed wheel for a smooth finish, the tool is swung from one side of the wheel to an intermediate point just beyond the peak at which the circular sides of the periphery to be formed join, thereby effecting a cut on one side of the wheel. The wheel is then shifted axially and the tool then swung from the intermediate point to the other side of the wheel and back to the intermediate point, effecting a cut and dead pass on said other side of the wheel. With the tool at the intermediate point, the wheel is shifted back to its initial position and the tool then swung back to its starting point, thereby effecting a dead pass over the side of the wheel which was trued at the beginning of the cycle. Thus a cut and dead pass is effected on each side of the wheel with a single swing of the tool from a predetermined home position at one side of the wheel to the far side of the wheel and back. On the other hand, a single cut on each side of the wheel without a dead pass to produce a sharper wheel can also be made in a single swing of the tool from the same home position to the far side of the wheel and back and without retraction of the cutting tool. This is accomplished by swinging the truing tool from one side of the wheel to the other without stopping at the intermediate point. Since the tool swings in a circular path, and only one side of the periphery of the wheel is in said path, only one side of the periphery of the wheel is cut. The tool is stopped at the far side of the wheel and the wheel shifted, placing the other side of the periphery of the wheel in the path of the tool and the tool is then swung back to its home position, cutting said other side of the periphery of the wheel. Thus the desired contour is trued without a dead pass by a single swing of the tool from a home position at one side of the wheel to the far side of the wheel and back.

It is therefore one object of the present invention to provide an improved mechanism for a grinding machine to true circular convex sides intersecting at a peak on the periphery of the grinding wheel.

It is another object of the present invention to provide a truing mechanism for a grinding machine in which a contour comprising convex circular arcs intersecting at a peak is generated on the grinding wheel without a template.

It is still another object of the present invention to provide a truing mechanism for forming convex circular arcs intersecting at a peak on the periphery of the grinding wheel of a grinding machine operable in a single swing, from a predetermined home position, around the edge of the wheel and back, to effect a cut on the wheel either with or without a dead pass.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 6 is an enlarged view taken on the line 6—6 of FIG. 1;

Figure 1:
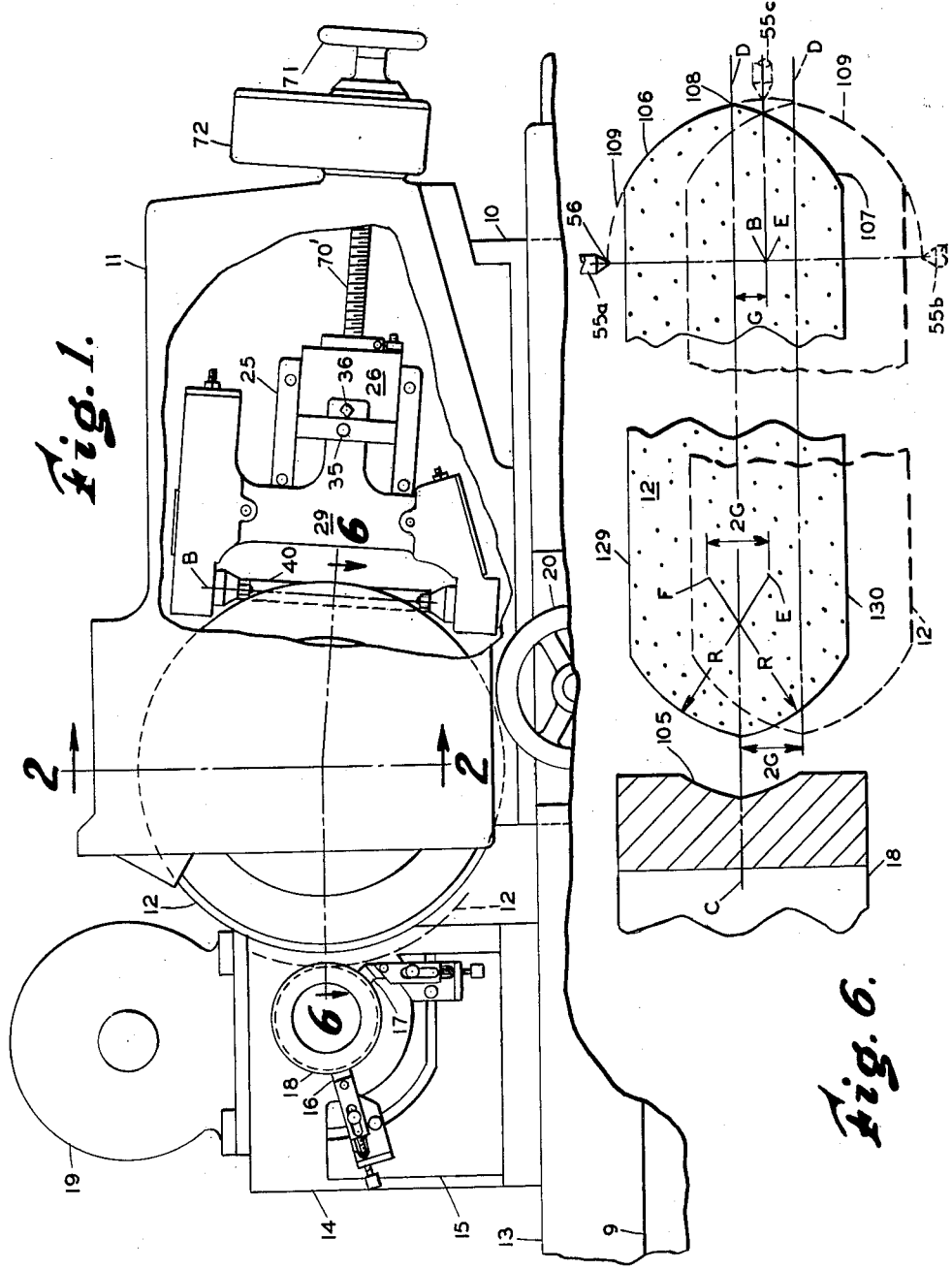
FIG. 1 is a fragmentary view in elevation, with parts broken away, of a grinding machine having the mechanism of the present invention.

There is shown in FIG. 1 a grinding machine having a base 9 with an upstanding portion 10 on which a wheelhead 11, carrying a grinding wheel 12, is pivotally mounted for rocking about a point below the grinding wheel. A cross slide 13, which straddles the upstanding base portion 10, is mounted on the base and carries a headstock 14. A support 15 having adjustable shoes 16 and 17 is secured to the slide in front of the headstock to support a workpiece as, for example, the inner race of a ball bearing, indicated at 18. The workpiece is rotated on the shoes by a magnetic driver (not shown) engaging the far side of the workpiece (as viewed in FIG. 1) and driven by the motor 19 mounted on the headstock. Handwheel 20 is operatively connected to cross slide 13 for positioning the workpiece relative to the grinding wheel. To effect a grind on the workpiece, the wheelhead 11 is rocked to bring the grinding wheel 12 into engagement with the workpiece as indicated by the dotted line in FIG. 1.

Figure 3:
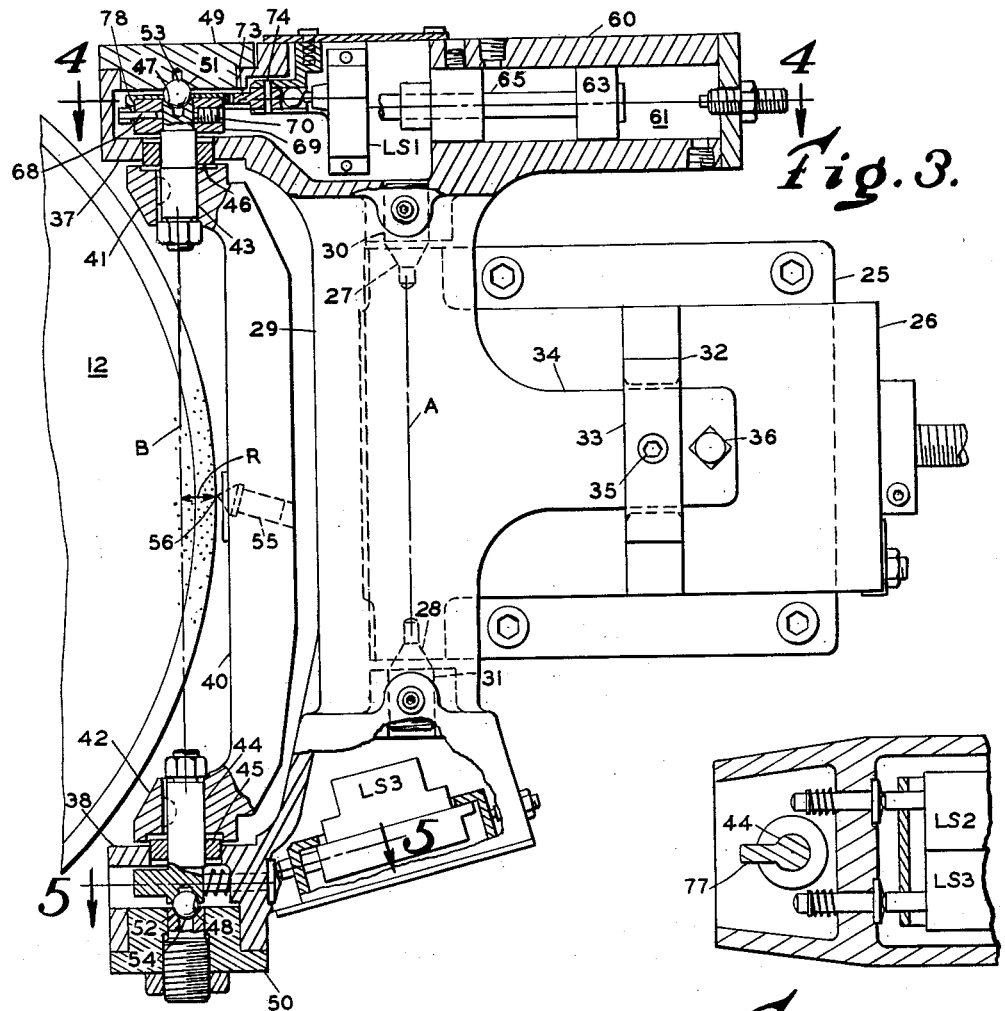
FIG. 3 is an enlarged view, partly in cross-section, showing the structure for mounting and swinging the truing tool.

A plate 25 having dovetailed ways is connected to the inner surface of one side of the wheel head behind the grinding wheel and receives a slide 26, which, as shown in FIG. 3, has a pair of opposed conical shaped recesses 27 and 28. A support 29 has a pair of opposed conical shaped extending pins 30, 31 received in recesses 27, 28 to mount the support 29 on the slide 26, the support being pivotal on the slide about the axis A defined by the pins 30, 31. The slide 26 has a bridge 32 connected thereto with an outer portion 33 spaced from the surface of the slide. The support 29 has an arm 34 extending away from the grinding wheel and under the bridge, the clearance between the outer portion 33 of the bridge and the slide 26 being greater than the thickness of the arm 34 so that the support 29 can be swung through a small angle about the axis A. The support 29 is held in a predetermined angular position on the slide 26 by means of two screws 35, 36, one (35) of which is threadedly received in the outer portion 33 of the bridge to engage the arm 34 and the other (36) of which is threadedly received in the arm to engage the surface of the slide 26. The support 29 also has upper and lower trunnion portions 37, 38 extending toward the grinding wheel and straddling a portion thereof.

A bracket 40 has an upper and lower arm 41, 42 which have pins 43, 44 keyed therein. These pins are rotatably received in seals 46, 45, snugly received in support portions 37, 38, and terminate in sockets 47, 48. Caps 49, 50, snugly received in portions 37, 38 of the support, have sockets 51, 52 aligned with and opposite sockets 47, 48, respectively. Balls 53, 54, received in the aligned and opposing sockets, establish a pivotal connection between the bracket 40 and support 29 which permits the bracket to swing on the support about a pivot axis B which intersects the grinding wheel. A truing tool 55 is mounted in the bracket 40 with the diamond point 56 thereof toward the axis B, but spaced therefrom a distance R, so that, as the bracket is swung on the support, the diamond point follows a circular path of radius R around the edge of the grinding wheel. The bracket 40 is swung around the edge of the wheel by a fixed stroke reversible hydraulic motor 60 which has a pair of cylinders 61, 62, as shown best in FIGS. 4 and 7, each containing a piston 63, 64. The pistons are connected to piston rods 65, 66 which, in turn, are connected to the ends of a chain 67. Chain 67 is connected at 68 to a wheel 69 secured on pin 43 by set screw 70 so that operation of bracket motor 60 swings the bracket 40 through chain 67, wheel 69, and pin 43.

The slide 26, as shown in FIG. 1, threadedly receives a screw 70' journaled in the wheelhead and connected to handwheel 71. A pick feed mechanism 72 may be automatically energized at each truing cycle to rotate the screw a predetermined amount and thereby advance the diamond point a predetermined increment toward the wheel. It will be seen that with handwheel 71 (which provides adjustment of the slide 26, and hence the support 29, radially relative to the grinding wheel 12) and screws 35 and 36 (which provide angular adjustment of the support 29 about the axis A), the axis B, which is spaced on the support from the axis A, can be radially and laterally adjusted with precision relative to the grinding wheel 12.

Figure 5:
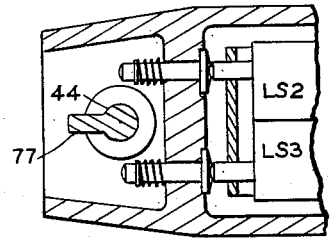
FIG. 5 is a view taken on the line 5—5 of FIG. 3.
Figure 4:
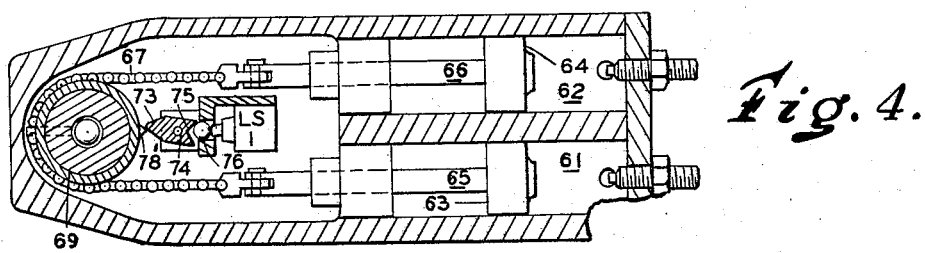
FIG. 4 is a view taken on the line 4—4 of FIG. 3.

As shown in FIGS. 3 and 5 the lower pivot pin 44 has an extending finger 77 which operates limit switch LS3 when the bracket 40, and hence the truing tool is in a home position (shown in FIG. 1 and at 55a, FIG. 6) beyond one side of the grinding wheel, and operates the limit switch LS2 when the bracket, and hence the truing tool is beyond the opposite side of the wheel (shown at 55b, FIG. 6). The angular positions of the truing tool at which the limit switches LS2 and LS3 are operated determine the extreme limits of the movement of the truing tool, which are illustrated as 180 degrees apart. As shown in FIGS. 3 and 4 the chain wheel 69 carries a cam 78 having a lobe 78' at the same angular position relative to axis B as the cutting tool 55 which trips a finger 73 pivotally mounted at 74 in the support 29 when the truing tool is at an intermediate position midway between the extreme limits of its swing. The finger 73 has a conical recess 75 receiving a ball 76 which depresses the plunger of LS1 precisely at the same intermediate angular position of the truing tool regardless of the direction from which the cam 78 approaches the finger 73.

Figure 2:
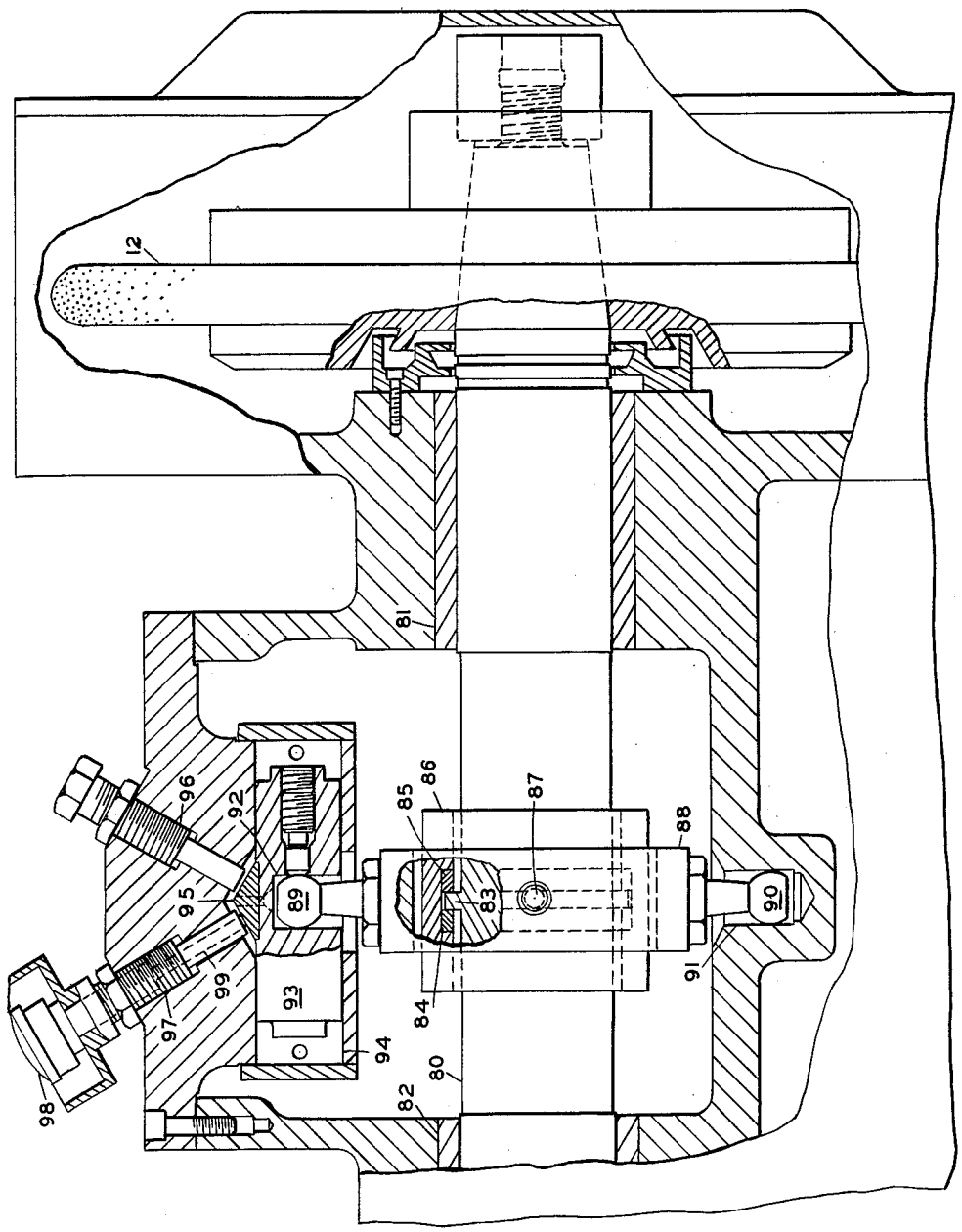
FIG. 2 is a view taken on the line 2—2 of FIG. 1.

As shown best in FIG. 2 the grinding wheel 12 is mounted for rotation on a spindle 80 journaled in sleeve bearings 81 and 82 in the wheelhead and rotated therein by an electric motor (not shown). The spindle is axially shiftable in the bearings by a fixed, but adjustable, stroke hydraulic motor. The spindle has a collar 83 received between two ring thrust bearings 84, 85 which are received in an internal groove in a sleeve 86. The sleeve is pivotally connected at 87 to a yoke 88 encircling the sleeve with clearance and having two oppositely extending pivot pins 89, 90 received therein. One pivot pin is received in socket 91 in the wheelhead and the other is received in a socket 92 in piston 93. The piston 93 is received in cylinder 94 in the wheelhead and has a beveled stop member 95 secured thereto. Stop screws 96, 97 received in the wheelhead are adapted to engage the opposite sides of the stop member 95 and establish the stroke of the spindle hydraulic motor defined by the piston 93 and cylinder 94. The stroke of piston 93, which can be varied by adjustment of stop screws 96 and 97, determines the axial movement of the spindle and this movement is indicated by the gage 98, the operating plunger 99 of which extends through stop screw 96 to engage one side of the stop member 95.

As shown in FIG. 6, the workpiece 18 has a plane C which defines the center plane for the gothic groove 105 to be formed thereon, and the grinding wheel has a plane D which defines the center plane of the contour on the periphery thereof for forming the gothic arch groove in the workpiece. These planes must coincide as the piece is ground. The stop screws 96, 97 are adjusted so that the spindle is in one extreme position with stop 95 against one of the screws, as, for example, 97 when the grinding wheel is properly positioned axially relative to the workpiece (with planes C and D coinciding) for grinding. If the contour to be trued on the periphery of the grinding wheel comprises convex arcuate sides 106 and 107 intersecting at peak 108, with the sides defining circular arcs having centers E, F spaced a distance 2G apart, then the pivot axis B is initially positioned by handwheel 71 and screws 35, 36 a distance G from the coincident planes C, D (to coincide with the center, such as E, of one of the desired arcs) and in a position to bring the side 106 of the periphery of the rotating wheel 12 (which is retracted from the workpiece for truing as shown in FIG. 6) into the path 109 of the cutting point 56, which moves in a circular arc of radius R about the axis B. If stop screw 97 defines this initial axial position of the grinding wheel, the other stop screw 96 is set so that the spindle can be shifted axially, to shift the grinding wheel laterally, a distance 2G to a second axial position after the side 106 has been trued, thereby bringing the center F of the other desired arc into axis B and the side 107 into the path 109 of the cutting point.

Figure 7:
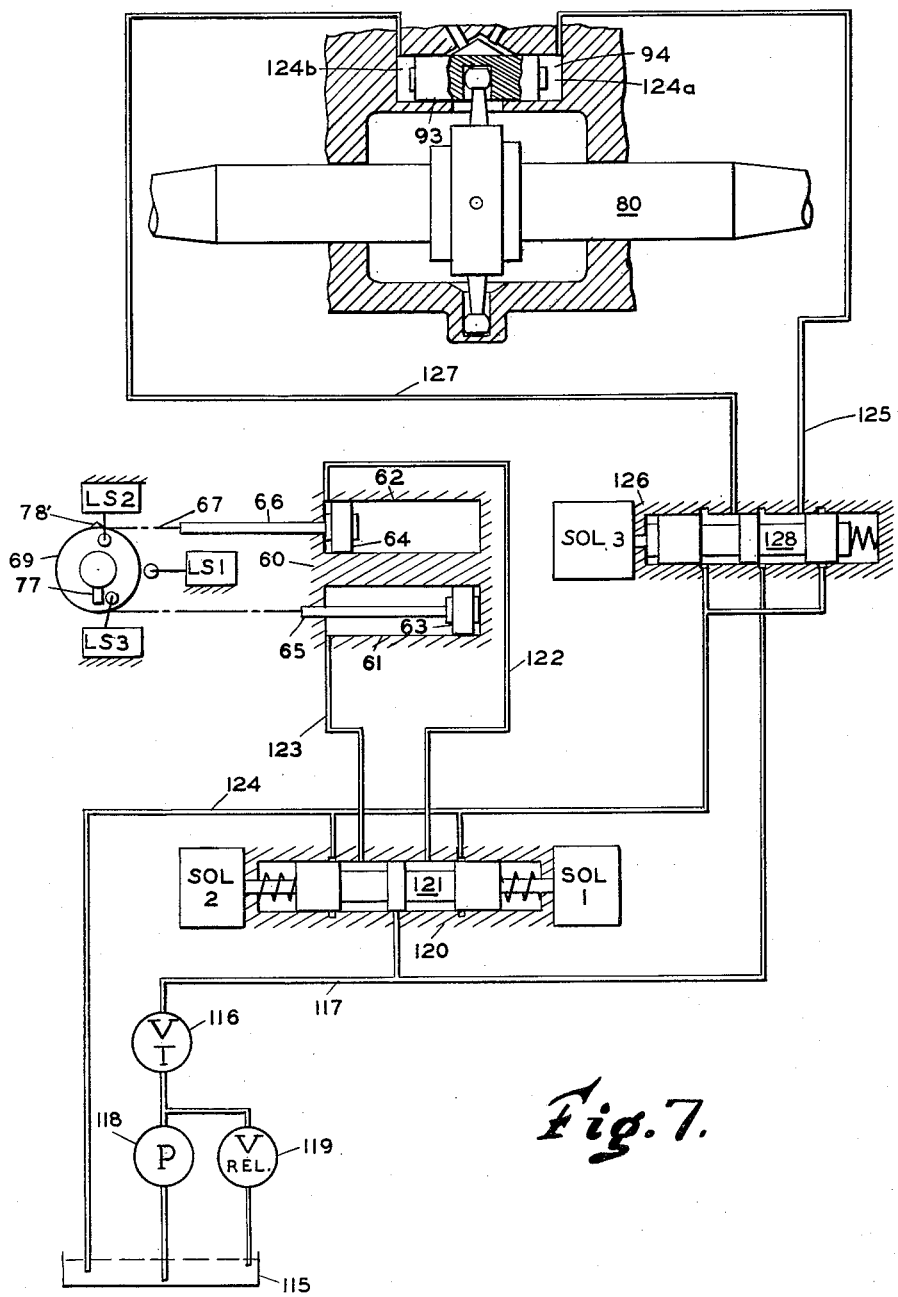
FIG. 7 is a schematic diagram of the hydraulic circuit for the mechanism of the present invention.

The hydraulic circuit for effecting truing is shown in FIG. 7. Fluid from sump 115 is supplied through the throttle valve 116 to a pressure line 117 by a pump 118, the maximum pressure being established by relief valve 119 discharging to sump 115. On energization of solenoid SOL1 of the solenoid operated spring centered reversing valve 120, the plunger 121 thereof shifts to the left, as viewed in FIG. 7, and fluid is supplied through motor line 122 to one end of cylinder 62, urging the piston 64 therein to the right and swinging the tool 55 clockwise (as viewed in FIG. 6). Fluid from cylinder 61 is discharged through motor line 123, valve 120 and return line 124 to the sump 115 as the piston 63 is moved to the left by chain 67. To swing the truing tool in the opposite direction, solenoid SOL2 is energized to shift plunger 121 to the right and introduce pressure through line 123 to cylinder 61. At this time cylinder 62 is connected through line 122 and valve 120 to return line 124. If neither solenoid SOL1 nor solenoid SOL2 is energized the pressure line 117 is blocked at valve 120 and the truing tool is stopped.

During grinding, and for the truing of one side 106 of the periphery of the rotating grinding wheel, solenoid SOL3 is deenergized and the valve member 128 of valve 126 is at the left, as shown in FIG. 7. At this time line 117 is connected to motor line 125 leading to one end 124a of cylinder 94, so that piston 93 is urged to the left (as viewed in FIG. 7 and FIG. 2). Fluid from the end 124b of cylinder 94 is discharged through motor line 127, valve 126, and return line 124 to the sump 115. After the one side of the wheel has been trued, solenoid SOL3 is energized to shift the plunger 128 of valve 126 to the right, introducing pressure to line 127 and end 124b of cylinder 94, and connecting end 124a and line 125 to return line 124. This shifts the grinding wheel to the position shown in dotted lines in FIG. 6 for truing the side 107 of the periphery of the wheel.

Figure 8:
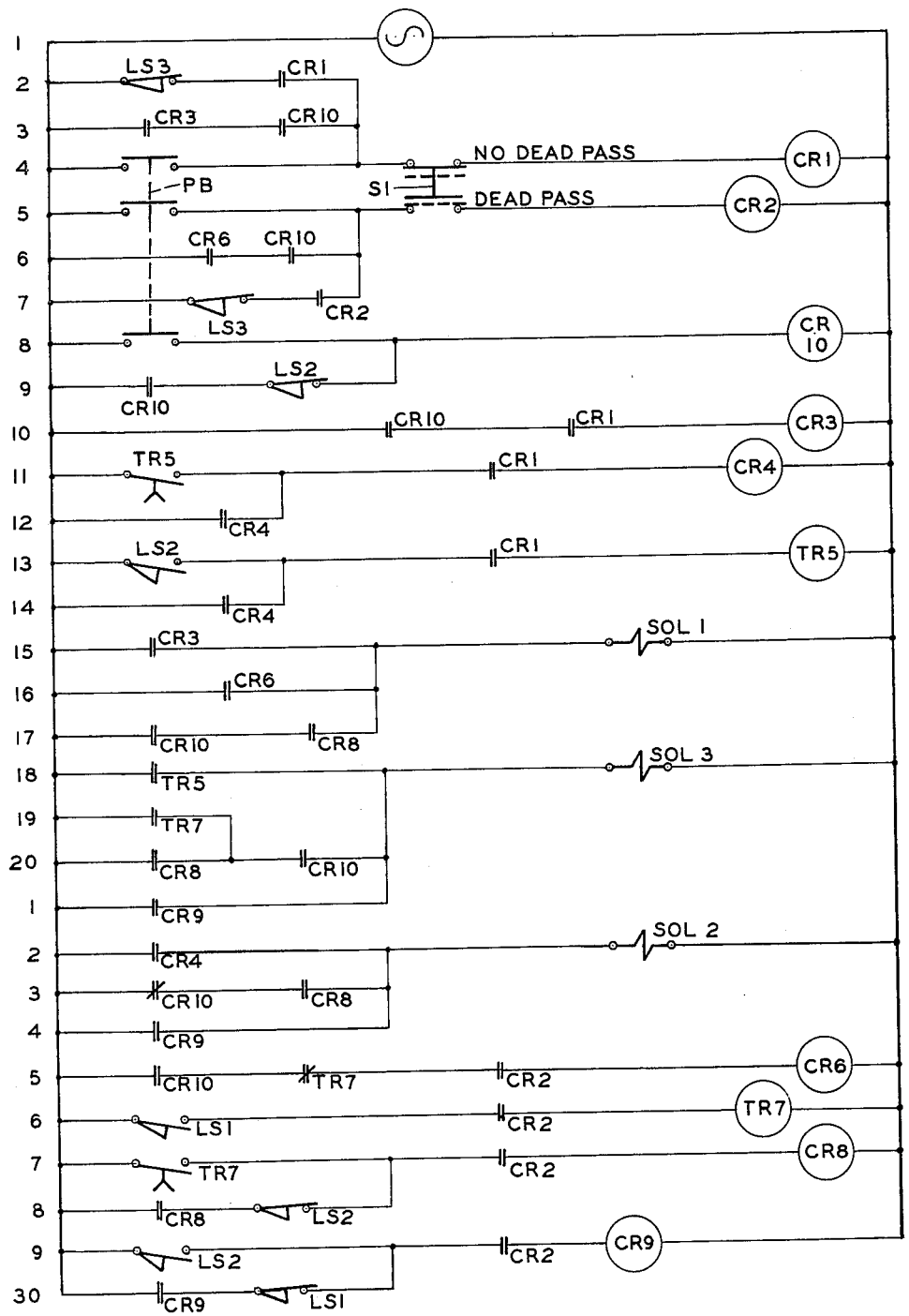
FIG. 8 is a schematic diagram of the electrical circuit for the mechanism of the present invention.

The electrical circuit for effecting a selected truing cycle is shown in FIG. 8. The line location of certain electrical components in that figure are given in parenthesis in the description that follows. During the grind, the truing tool 55 is parked beyond side 129 of the grinding wheel and, when the wheelhead 11 is retracted to the position shown in FIG. 1 and before a truing cycle is begun, pick feed mechanism 72 is actuated to effect an incremental advance of the support 29 radially relative to the grinding wheel. A corresponding advance of slide 13, to advance workpiece 18, is effected through suitable mechanisms (not shown) before the next grind to compensate for reduction of the grinding wheel. Thus, at the beginning of a truing cycle, the grinding wheel 12 and truing tool 55 are in the positions shown in solid lines in FIG. 6. The limit switch LS3 is operated and the limit switches LS1 and LS2 are unoperated. If a cycle with no dead pass is desired, the selector switch S1 (line 4) is shifted to the position shown in solid lines in FIG. 8 and relay CR2 (line 5), connected in series with the open contacts of switch S1, will not be energized during the cycle. Relays CR6 (line 25), TR7 (line 26), CR8 (line 27), and CR9 (line 29) each of which is connected in series with normally open contacts of relay CR2, will not be picked up in this cycle.

After the slide 26 has been advanced an incremental amount from its position during the previous truing cycle, the pushbutton switch PB (lines 4, 5, 8) is momentarily closed and relays CR1 (line 4) and CR10 (line 8) are energized to energize relay CR3 (line 10) connected in series with normally open contacts thereof. Relay CR10 is sealed in through its own normally open contacts and normally closed contacts of limit switch LS2, and relay CR1 is initially sealed in through normally open contacts of relays CR3 and CR10. Solenoid SOL1 (line 15) is energized through normally open contacts of relay CR3 and the cutting tool 55 swings to the position indicated at 55b in FIG. 6 beyond the side 130 of the grinding wheel, cutting the side 106 of the periphery of the wheel. It will be noted that after the tool has left the home position the relay CR1 is also sealed in through the normally closed contacts of limit switch LS3 and its own normally open contacts.

When the cutting tool reaches position 55b, limit switch LS2 is operated and relay CR10 is dropped, dropping relay CR3, but relay CR1, initially sealed in through normally open contacts of relay CR10, is held in through the normally closed contacts of LS3. As relay CR3 drops, solenoid SOL1 is denergized and the cutting tool stops. At this time timer relay TR5 (line 13) is energized through normally open contacts of limit switch LS2 and the normally open contacts of relay CR1. This energizes solenoid SOL3 (line 18) through the normally open contacts of relay TR5 so that the grinding wheel is shifted to the position shown in dotted lines in FIG. 6. After the wheel has been shifted, the normally open delay close contacts of relay TR5 close to pick up relay CR4 (line 11) through the normally open contacts of relay CR1. Relay TR5 is sealed in through normally open contacts of relay CR4, and relay CR4 is sealed in through its own normally open contacts. When relay CR4 is picked up solenoid SOL2 (line 22) is energized through the normally open contacts of relay CR4 and the tool is swung back to its home position at 55a, cutting the side 107 of the periphery of the wheel. As the tool reaches its home position limit switch LS3 is operated, dropping out relay CR1 and therefore dropping out relays CR4 and TR5. This drops solenoid SOL2 and solenoid SOL3 so that the cutting tool stops and the grinding wheel is shifted back to the position shown in solid lines in FIG. 6.

If a truing cycle with a cut and dead pass on each side of the periphery of the wheel is desired, the selector switch S1 is shifted to the position shown in dotted lines and relay CR1 will not be picked up during the cycle. Therefore, relays CR3, CR4, and TR5, each of which is connected in series with normally open contacts of relay CR1, will not be energized in this cycle. Relays CR2 (line 5) and CR10 will be energized when the pushbutton switch PB is momentarily closed, and relay CR6 (line 25) will be picked up through the normally open contacts of relays CR2 and CR10 and the normally close contacts of relay TR7. Relay CR10 is sealed in as described in the previous cycle, and relay CR2 is initially sealed in through normally open contacts of relays CR6 and CR10. Solenoid SOL1 is energized through normally open contacts of relay CR6 and the tool is swung to the intermediate position (shown at 55c in FIG. 6), taking a cut on the side 106 of the periphery of the wheel. It will be noted that after the truing tool has left the home position and limit switch LS3 released, the relay CR2 will also be sealed in through the normally closed contacts of limit switch LS3 and its own normally open contacts.

When the tool reaches the intermediate position 55c, limit switch LS1 is operated and timer relay TR7 (line 26) is energized through the normally open contacts of the limit switch LS1 and the normally open contacts of relay CR2. This drops out relay CR6, deenergizing solenoid SOL1, and energizing solenoid SOL3 through the normally open contacts of relay TR7 and relay CR10. This causes the grinding wheel to shift to the position shown in dotted lines in FIG. 6 and, after the shift has been completed, the normally open delay close contacts of relay TR7, connected in series with normally open contacts of relay CR2, close to energize relay CR8 (line 27).

When the relay CR8 is energized, the solenoid SOL3 is sealed in around the contacts of relay TR7 by the normally open contacts of relay CR8. When relay CR8 is picked up solenoid SOL1 is energized through the normally open contacts of relays CR8 and CR10 and the tool is swung to the position 55b, taking a cut on the side 107 of the periphery of the grinding wheel. As the tool leaves the intermediate position, relay TR7 is dropped but relay CR8 is sealed in through its own normally open contacts and the normally closed contacts of limit switch LS2.

When the tool reaches the position 55b limit switch LS2 is operated and relays CR10 and CR8 are dropped to drop solenoid SOL1. At the same time relay CR9 (line 29) is energized through the normally open contacts of limit switch LS2 and relay CR2 so that solenoid SOL2 is energized to reverse the tool. Relay CR9 is sealed in through its own normally open contacts and the normally closed contacts of limit switch LS1. Solenoid SOL3 is held energized through the normally open contacts of relay CR9 after the relays CR8 and CR10 are dropped to hold the wheel in the position shown in dotted lines in FIG. 6.

As the tool returns to the intermediate position a dead pass is taken on side 107, and, as it reaches the intermediate position, limit switch LS1 is operated to drop relay CR9 and thereby release solenoid SOL2 and solenoid SOL3 to stop the swinging of the tool and shift the grinding wheel back to the position shown in solid lines in FIG. 6. At the same time relay TR7 is again energized through the normally open contacts of limit switch LS1 and the normally open contacts of relay CR2. After the wheel has shifted, the normally open delay close contacts of TR7 close to again energize relay CR8 which is sealed in through its own normally open contacts and the normally closed contacts of limit switch LS2. The energization of solenoid SOL2 through the normally closed contacts of relay CR10 and the normally open contacts of relay CR8 when relay CR8 is picked up causes the tool to swing to the home position at 55a, taking a dead pass on the side 106 of the grinding wheel. Relay TR7 is dropped as the tool leaves the intermediate position and releases limit switch LS1. At the home position limit switch LS3 is operated to drop relay CR2, and thereby drop relay CR8, to release solenoid SOL2 and stop the tool.

What is claimed is:

1. In a grinding machine having a grinding wheel mounted on a spindle, mechanism to true convex arcuate sides intersecting at a peak on the periphery of the grinding wheel, said sides defining circular arcs having centers spaced a predetermined distance apart, the combination comprising a support mounted adjacent the grinding wheel, a bracket pivotally mounted on the support on an axis intersecting the grinding wheel, means to move the support for adjustably positioning said axis radially and laterally relative to the grinding wheel, a truing diamond having a cutting point mounted in the bracket with the point toward said axis and spaced therefrom, a fixed stroke reversible hydraulic motor connected to the grinding wheel spindle to shift the grinding wheel laterally said predetermined distance between a first position with the center of one of said arcs on said axis and a second position with the center of the other of said arcs on said axis, and a hydraulic motor connected to said bracket to swing the truing tool when the grinding wheel is in said first position and said second position, respectively.

2. In a grinding machine, mechanism to true convex arcuate sides intersecting at a peak on the periphery of the grinding wheel, said sides defining circular arcs having spaced centers, the combination comprising a support adjustably positionable relative to the grinding wheel, a bracket pivotally mounted on the support on an axis intersecting the grinding wheel, a hydraulic motor operatively connected to said bracket to swing said bracket on the support about said axis, a truing tool having a cutting point mounted in the bracket with the point toward said axis and spaced therefrom, a fixed stroke hydraulic motor relatively to position the grinding wheel and the support alternately to place the center of one of said arcs in said axis and to place the center of the other of said arcs in said axis, and control means operable to effect coordinated alternative operation of said hydraulic motors sequentially to swing the truing tool from one side of the grinding wheel to the other when the center of one of said arcs is in the axis, to effect relative shifting of the grinding wheel and support, and to reversely swing the truing tool from said other side of the grinding wheel to said one side.

3. In a grinding machine having a grinding wheel mounted on a spindle for rotation, mechanism to true convex arcuate sides intersecting at a peak on the periphery of the rotating grinding wheel, said sides defining circular arcs having spaced centers, the combination comprising a support adjustably positionable relative to the grinding wheel, a bracket pivotally mounted on the support on an axis intersecting the grinding wheel, a reversible hydraulic motor operatively connected to said bracket to swing said bracket on the support about said axis from a home position beyond one side of the grinding wheel to an extreme position beyond the opposite side thereof, a truing tool having a cutting point mounted in the bracket with the point toward said axis and spaced therefrom, a fixed stroke hydraulic motor operatively connected to the spindle to shift the grinding wheel between a first position with the center of one of said arcs in said axis and a second position with the center of the other of said arcs in said axis, means to operate said bracket motor when the spindle is in said first position to swing the truing tool from the home position to said extreme position, means to operate said spindle motor after the bracket is in said extreme position to shift the grinding wheel to said second position, and means to reversely operate said bracket motor after the grinding wheel is in said second position to swing the truing tool back to the home position.

4. In a grinding machine, mechanism to true convex arcuate sides intersecting at a peak on the periphery of the grinding wheel, said sides defining circular arcs having spaced centers, the combination comprising a support adjustably positionable relative to the grinding wheel, a bracket pivotally mounted on the support on an axis intersecting the grinding wheel, a hydraulic motor operatively connected to said bracket to swing said bracket on the support about said axis, a truing tool having a cutting point mounted in the bracket with the point toward said axis and spaced therefrom, a fixed stroke hydraulic motor relatively to position the grinding wheel and the support alternately to place the center of one of said arcs in said axis and to place the center of the other of said arcs in said axis, and control means operable to effect coordinated alternative operation of said motors sequentially to swing the truing tool across one side of the grinding wheel periphery to an intermediate position just beyond the peak when the center of said one arc defined by one side of the periphery is in said axis, to effect relative shifting of the grinding wheel and support to position the center of said other arc defined by the other side of the periphery in said axis, to swing the truing tool across said other side of the wheel and back to said intermediate position, to effect relative shifting of the grinding wheel and support to position the center of the arc defined by said one side of the periphery in said axis, and to swing the truing tool back across said one side from said intermediate position.

5. In a grinding machine having a grinding wheel mounted on a spindle for rotation, mechanism to true convex arcuate sides intersecting at a peak on the periphery of the rotating grinding wheel, said sides defining circular arcs having spaced centers, the combination comprising a support adjustably positionable relative to the grinding wheel, a bracket pivotally mounted on the support on an axis intersecting the grinding wheel, a reversible hydraulic motor connected to said bracket to swing said bracket on the support from a home position beyond one side of the grinding wheel to an extreme position beyond the opposite side thereof, a truing tool having a cutting point mounted in the bracket with the point toward said axis and spaced therefrom, a fixed stroke reversible hydraulic motor operatively connected to the spindle to shift the grinding wheel between a first position with the center of one of said arcs in said axis and a second position with the center of the other of said arcs in said axis, means to operate said bracket motor when the spindle is in said first position to swing the truing tool away from the home position, means to render said bracket motor ineffective at an intermediate position to stop the truing tool beyond said peak, means to operate said spindle motor after said truing tool has stopped to shift the grinding wheel to said second position, means to operate said bracket motor after the grinding wheel is in said second position to swing the truing tool from said intermediate position to said extreme position, means to reverse said bracket motor after the truing tool has reached said extreme position to return the truing tool to said intermediate position, means to render said bracket motor ineffective at the intermediate position to stop the truing tool, means to reversely operate said spindle motor after the truing tool is stopped to shift the grinding wheel to said first position, and means to operate said bracket motor after the grinding wheel is in said first position to return the truing tool to the home position.

6. In a grinding machine having a grinding wheel and a support adjacent thereto with a truing tool pivotally mounted thereon for swinging about an axis in a circular arc around the edge of the grinding wheel, mechanism to true circular convex sides on the periphery of the grinding wheel, said sides having spaced apart centers and intersecting at a peak, the mechanism comprising a fixed stroke reversible hydraulic motor operable when actuated to effect relative lateral shifting between the grinding wheel and the support alternately to position said centers in said axis, and control means operable to actuate said hydraulic motor at predetermined angular positions of the truing tool.

7. In a grinding machine having a grinding wheel mounted on a spindle and a support adjacent the grinding wheel having a bracket pivotally mounted thereon for swinging about an axis intersecting the grinding wheel, said bracket having a truing tool with a point toward said axis and spaced therefrom, mechanism for truing circular convex sides on the periphery of the grinding wheel, said sides having centers spaced apart a predetermined amount and intersecting at a peak, the mechanism comprising in combination, means to relatively position the grinding wheel and the support in a direction lateral to the grinding wheel to position the center of one of said sides in said axis, a fixed stroke hydraulic motor connected to the spindle operable when actuated to shift said spindle axially said predetermined amount to position the center of the other of said sides in said axis, and control means operable at predetermined angular positions of the bracket to actuate said hydraulic motor.

References Cited in the file of this patent
UNITED STATES PATENTS

| | | |
|---|---|---|
| 1,874,156 | Barish | Aug. 30, 1932 |
| 2,340,192 | Locke | Jan. 25, 1944 |
| 2,690,170 | Allen | Sept. 28, 1954 |